United States Patent
Tan (10) Patent No.: US 11,226,512 B2
(45) Date of Patent: Jan. 18, 2022

(54) LIQUID CRYSTAL DISPLAY DEVICE AND DISPLAY METHOD

(71) Applicant: BOE TECHNOLOGY GROUP CO., LTD., Beijing (CN)

(72) Inventor: Jifeng Tan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 79 days.

(21) Appl. No.: 16/620,755

(22) PCT Filed: Apr. 22, 2019

(86) PCT No.: PCT/CN2019/083611
§ 371 (c)(1),
(2) Date: Dec. 9, 2019

(87) PCT Pub. No.: WO2019/210785
PCT Pub. Date: Nov. 7, 2019

(65) Prior Publication Data
US 2020/0103697 A1 Apr. 2, 2020

(30) Foreign Application Priority Data

May 4, 2018 (CN) .......................... 201810421549.6

(51) Int. Cl.
*G02F 1/1335* (2006.01)
*F21V 8/00* (2006.01)
*G09G 3/36* (2006.01)

(52) U.S. Cl.
CPC ..... *G02F 1/133512* (2013.01); *G02B 6/0036* (2013.01); *G02F 1/133514* (2013.01); *G09G 3/3607* (2013.01)

(58) Field of Classification Search
CPC ......... G02F 1/133512; G02F 1/133514; G02B 6/0036; G09G 3/3607
See application file for complete search history.

(56) References Cited

U.S. PATENT DOCUMENTS 5,781,262 A * 7/1998 Suzuki .............. G02F 1/133753
349/128
5,786,876 A * 7/1998 Ota ................... G02F 1/133512
349/42

(Continued)

FOREIGN PATENT DOCUMENTS

CN 10254665 A 9/2012
CN 102866550 A 1/2013

(Continued)

OTHER PUBLICATIONS

Office Action of CN Application No. 201810421549.6 and English translation, dated Mar. 18, 2020, 16 pages.

(Continued)

*Primary Examiner* — Afroza Chowdhury
(74) *Attorney, Agent, or Firm* — Muncy, Geissler, Olds and Lowe, P.C.

(57) ABSTRACT

A liquid crystal display device and a display method are provided. The liquid crystal display device includes a light guide plate including a plurality of light extraction areas arranged along a first direction, and a liquid crystal display component arranged in a light exiting direction of the light guide plate; in a thickness direction of the liquid crystal display component, each of the plurality of pixel areas includes a first electrode layer, a second electrode layer, a liquid crystal layer, and a light filter layer arranged on a side of the liquid crystal layer that is away from the light guide plate; the light filter layer includes a plurality of first light shielding strips arranged along the first direction; each of the plurality of first light shielding strips extends along a second direction substantially perpendicular to the first direction.

14 Claims, 6 Drawing Sheets

(56) References Cited

U.S. PATENT DOCUMENTS

| | | | |
|---|---|---|---|
| 2006/0038939 A1 | 2/2006 | Okada | |
| 2009/0257119 A1* | 10/2009 | Uehara | G02F 1/133526 |
| | | | 359/463 |
| 2013/0002974 A1* | 1/2013 | Minato | G02B 5/201 |
| | | | 349/43 |
| 2013/0188106 A1* | 7/2013 | Nishida | G02F 1/133512 |
| | | | 349/33 |
| 2014/0055716 A1 | 2/2014 | Zhang | |
| 2014/0084319 A1 | 3/2014 | Wang et al. | |
| 2015/0029449 A1* | 1/2015 | Woo | G02F 1/136209 |
| | | | 349/110 |
| 2015/0301399 A1* | 10/2015 | Tamaki | G02F 1/133504 |
| | | | 349/96 |
| 2016/0342042 A1* | 11/2016 | Yu | G02F 1/134336 |
| 2017/0168223 A1* | 6/2017 | Feng | G02B 26/001 |
| 2018/0011370 A1* | 1/2018 | Yu | G02F 1/133514 |
| 2018/0061862 A1* | 3/2018 | Chen | G02F 1/136286 |
| 2018/0081208 A1* | 3/2018 | Zhao | G09G 3/3696 |
| 2019/0204708 A1* | 7/2019 | Wang | G02F 1/133526 |
| 2019/0265492 A1* | 8/2019 | Yuuki | H04N 13/31 |
| 2019/0278129 A1* | 9/2019 | Zhu | G02F 1/13306 |
| 2020/0064679 A1* | 2/2020 | Li | G02F 1/133509 |
| 2020/0103697 A1 | 4/2020 | Tan | |

FOREIGN PATENT DOCUMENTS

| | | |
|---|---|---|
| CN | 103543552 A | 1/2014 |
| CN | 106707608 A | 5/2017 |
| CN | 106773314 A | 5/2017 |
| CN | 107238974 A | 10/2017 |
| CN | 107945760 A | 4/2018 |
| CN | 108594517 A | 9/2018 |
| JP | 2015141314 A | 8/2015 |

OTHER PUBLICATIONS

International Search Report of PCT/CN2019/083611 and English translation, dated Jul. 22, 2019, 16 pages.

* cited by examiner

LIQUID CRYSTAL DISPLAY DEVICE AND DISPLAY METHOD

CROSS-REFERENCE TO RELATED APPLICATIONS

This application is a U.S. national phase application of a PCT Application No. PCT/CN2019/083611 filed on Apr. 22, 2019, which claims a priority to Chinese Patent Application No. 201810421549.6 filed on May 4, 2018, the disclosures of which are incorporated herein in their entirety by reference.

TECHNICAL FIELD

The present disclosure relates to the field of display technology, in particular to a liquid crystal display device and a display method.

BACKGROUND

The liquid crystal display is widely used in the field of display technology due to its advantages such as zero radiation, low energy consumption, low heat dissipation, accurate image reproduction, stable display and no flicker. In conventional liquid crystal display devices, polarizers which have polarization directions perpendicular to each other are respectively provided on a side of an array substrate and a side of a cell alignment substrate, complicating a structure of the liquid crystal display device.

SUMMARY

In one aspect, the embodiments of the present disclosure provide a liquid crystal display device. The liquid crystal display device includes a light guide plate including a plurality of light extraction areas arranged along a first direction, and a liquid crystal display component arranged in a light exiting direction of the light guide plate; where, the liquid crystal display component includes a plurality of pixel areas arranged in array; in a thickness direction of the liquid crystal display component, each of the plurality of pixel areas includes a first electrode layer, a second electrode layer, a liquid crystal layer, and a light filter layer arranged on a side of the liquid crystal layer that is away from the light guide plate; the light filter layer includes a plurality of first light shielding strips arranged along the first direction; each of the plurality of first light shielding strips extends along a second direction substantially perpendicular to the first direction; and each of the plurality of light extraction areas corresponds to one first light shielding strip; a width of each of the plurality of light extraction areas in the first direction is larger than a width of the corresponding first light shielding strip in the first direction.

Optionally, the light filter layer further includes a second light shielding strip arranged between adjacent first light shielding strips of the plurality of first light shielding strips and parallel to the first light shielding strips; a primary color light-filtering pattern is arranged between each of the adjacent first light shielding strips and the second light shielding strip; the primary color light-filtering patterns on both sides of each of the plurality of first light shielding strips are identical in color, and the primary color light-filtering patterns on both sides of the second light shielding strip are different in color.

Optionally, the primary color light-filtering patterns on both sides of each of the plurality of first light shielding strips are symmetrical about the first light-shielding strip.

Optionally, an orthographic projection of the second light shielding strip on the light guide plate does not overlap with the light extraction areas.

Optionally, both each of the plurality of light extraction areas and the corresponding first light shielding strip are axisymmetric; a symmetry axis of each of the plurality of light extraction areas coincides with a symmetry axis of an orthographic projection of the corresponding first light shielding strip on the light guide plate; the symmetry axis of each of the plurality of light extraction areas is parallel to the second direction.

Optionally, a difference c between a half width of each of the plurality of light extraction areas in the first direction and a half width of each of the plurality of first light shielding strips in the first direction is determined by a thickness d of the liquid crystal layer, an angle θ between a light ray emitted from the light extraction area to the light filter layer and a thickness direction of the liquid crystal display device, and a distance h from a light exiting surface of the light guide plate to the light filter layer.

Optionally, a maximum value of the difference between the half width of each of the plurality of light extraction areas in the first direction and the half width of each of the plurality of first light shielding strips in the first direction is $c_{max}=h*\tan\theta$; and a minimum value of the difference between the half width of each of the plurality of light extraction areas in the first direction and the half width of each of the plurality of first light shielding strips in the first direction is $c_{min}=(h-d)*\tan\theta$.

Optionally, the liquid crystal display device further includes: a filling layer arranged on the light exiting surface of the light guide plate; where, each of the plurality of light extraction areas is provided with a light extraction grating; and a refraction index of the filling layer is smaller than a refraction index of the light guide plate, and is different from a refraction index of a grating strip of the light extraction grating.

Optionally, the plurality of light extraction areas and the plurality of pixel areas are in one-to-one correspondence; each of the plurality of light extraction areas is located in an orthographic projection of the corresponding pixel area on the light guide plate.

Optionally, each of the plurality of light extraction areas corresponds to a column of the pixel areas arranged along the second direction.

In another aspect, the embodiments of the present disclosure provide a display method, applied to the liquid crystal display device described above, including: inputting a data signal to the first electrode layer and the second electrode layer according to an image to be displayed, such that an equivalent lens is formed in each of the plurality of pixel areas; and adjusting a direction of a light beam emitted from each of the plurality of light extraction areas by using the equivalent lens, so as to adjust an amount of light incident to the corresponding first light shielding strip.

BRIEF DESCRIPTION OF THE DRAWINGS

In order to illustrate the technical solutions of the embodiments of the present disclosure or in the prior art in a clearer manner, the drawings required for the description of the embodiments or the prior art will be described briefly hereinafter. Obviously, the following drawings merely depict some embodiments of the present disclosure, and based on these drawings, a person skilled in the art may obtain other drawings without any creative effort.

DETAILED DESCRIPTION

The technical solutions in the embodiments of the present disclosure will be described hereinafter clearly and completely with reference to the drawings of the embodiments of the present disclosure. Obviously, the following embodiments are merely a part of, rather than all of, the embodiments of the present disclosure. Based on these embodiments, a person skilled in the art may, without any creative effort, obtain other embodiments, which also fall within the scope of the present disclosure.

In the related art, based on a principle of liquid crystal grating, a liquid crystal display device which does not require a polarizer is proposed. A light extraction area of a light guide plate is arranged directly under a light shielding unit in a light filter layer, and when a grayscale 0 is displayed, light emitted from the light extraction area is exactly directed to the light shielding unit. When grayscales of 1-255 are displayed, a liquid crystal layer is driven to form a periodically arranged liquid crystal grating, and a display is achieved by means of a diffraction of light rays by the liquid crystal grating. However, in order to increase an aperture ratio, a relatively small light shielding unit is usually provided, so that the light extraction area is relatively small, resulting in that a lesser percentage of light rays is coupled out of the light guide plate, thereby leading to a low utilization of the light rays in the light guide plate.

Figure 1:
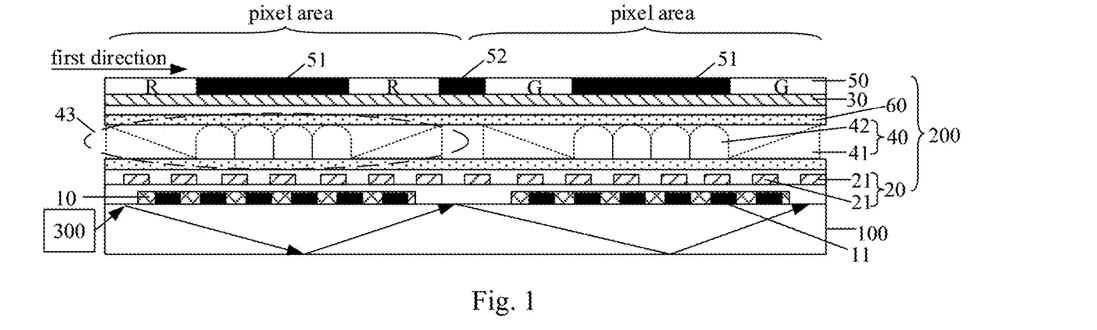
FIG. 1 is a schematic structural diagram of a liquid crystal display device according to an embodiment of the present disclosure.
Figure 2:
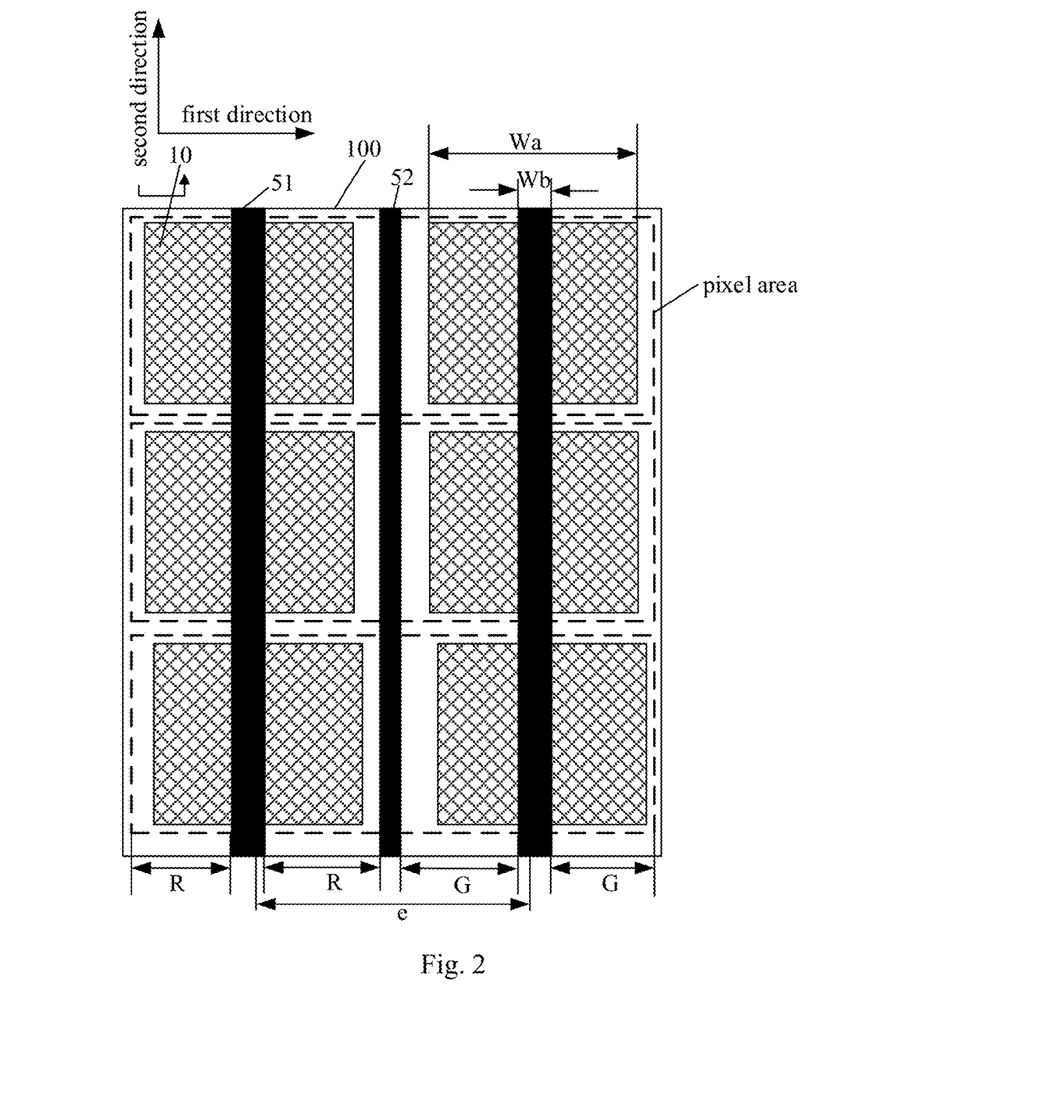
FIG. 2 illustrates a correspondence between a first light shielding strip and a light extraction area according to an embodiment of the present disclosure.

The embodiment of the present disclosure provides a liquid crystal display device. As shown in FIG. 1 and FIG. 2, the liquid crystal display device includes a light guide plate 100 with a plurality of light extraction areas 10 along a first direction, and a liquid crystal display component 200 arranged in a light exiting direction of the light guide plate 100; where, the liquid crystal display component 200 includes a plurality of pixel areas arranged in array; in a thickness direction of the liquid crystal display component 200, each of the plurality of pixel areas includes a first electrode layer 20, a second electrode layer 30, a liquid crystal layer 40, and a light filter layer 50 arranged on a side of the liquid crystal layer 40 that is away from the light guide plate 100; the light filter layer 50 includes a plurality of first light shielding strips 51 arranged along the first direction; each of the plurality of first light shielding strips 51 extends along a second direction substantially perpendicular to the first direction; and each of the plurality of light extraction areas 10 corresponds to one first light shielding strip 51; a width Wa of the light extraction area 10 in the first direction is larger than a width Wb of the corresponding first light shielding strip 51 in the first direction.

Figure 3:
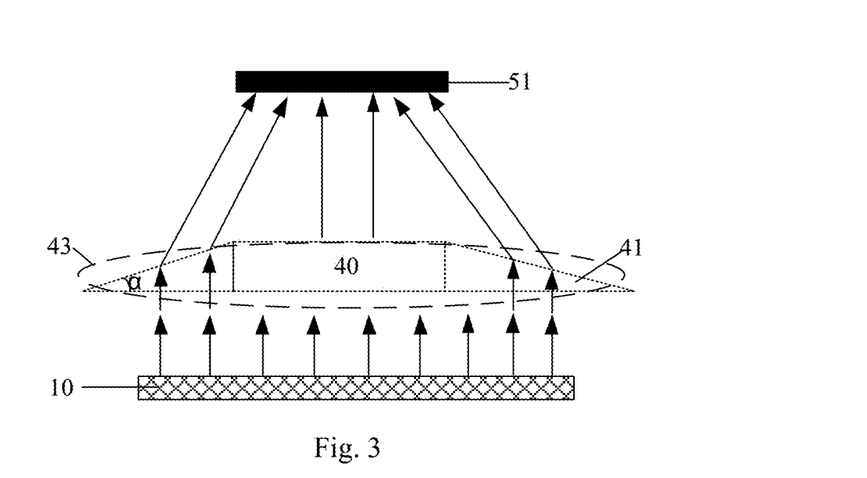
FIG. 3 is a diagram illustrating a refraction path of a light ray emitted from the light extraction area according to an embodiment of the present disclosure.
Figure 4:
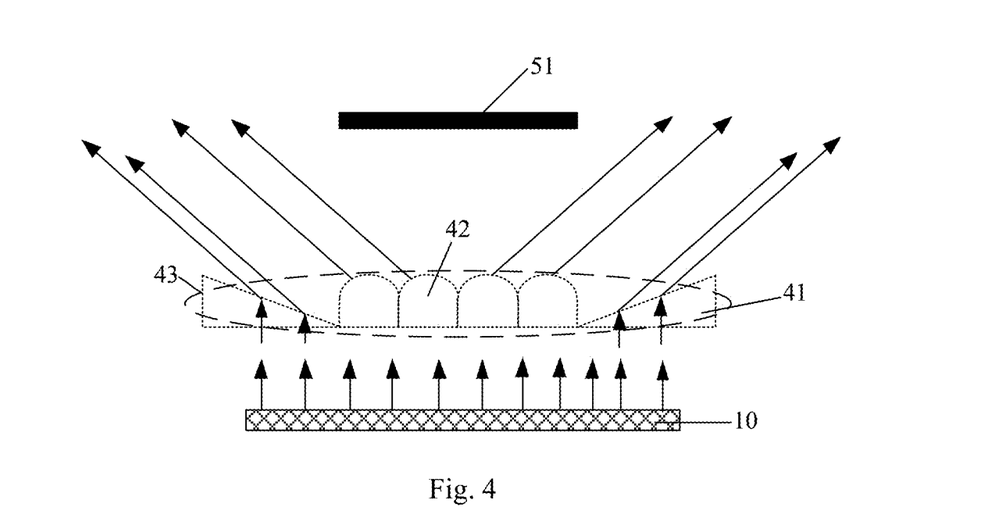
FIG. 4 is a diagram illustrating a refraction path of a light ray emitted from the light extraction area according to an embodiment of the present disclosure.

In the embodiments of the present disclosure, as shown in FIG. 3 and FIG. 4, driven by the first electrode layer 20 and the second electrode layer 30, the liquid crystal layer 40 forms an equivalent lens 43. A data signal is inputted to the first electrode layer and the second electrode layer according to an image to be displayed, thereby forming an equivalent lens in each of the plurality of pixel areas. A direction of a light beam emitted from each of the plurality of light extraction areas is adjusted by the equivalent lens, thereby an amount of light incident to the corresponding first light shielding strip is adjusted, so as to achieve a display of different grayscales.

It should be noted that, the back light of the liquid crystal display device emits from the light extraction areas 10 of the light guide plate 100 to enable the liquid crystal display component 200 to display. As far as a distribution of the light extraction areas 10 is concerned, for example, the plurality of light extraction areas 10 may be of the same size and arranged in array on a light exiting surface of the light guide plate 100; alternatively, the plurality of light extraction areas 10 may be of the same size, and have a spaced arrangement along the first direction. A spacing may be provided between the plurality of light extraction areas 10.

The light exiting direction of the light guide plate 100 refers to a travel direction of the light rays emitted from the light extraction areas 10 of the light guide plate 100. Other structures may be arranged between the liquid crystal display component 200 and the light guide plate 100, or the liquid crystal display component 200 may be directly arranged on the light exiting surface of the light guide plate 100.

In some embodiments, the first direction may be a direction in which light propagates in the light guide plate 100. In the context of the present disclosure, "the direction in which light propagates in the light guide plate 100" refers to a direction from one side of the light guide plate 100 that is provided with a light source 300 to an opposite side. The first direction is perpendicular to the second direction. For example, when the light guide plate 100 is rectangular in shape, the first direction and the second direction are respectively parallel to two edges perpendicular to each other of the light guide plate 100.

The first electrode layer 20 and the second electrode layer 30 drive the liquid crystal layer 40 to form the equivalent lens 43. The first electrode layer 20 and the second electrode layer 30 may be arranged on opposite sides of the liquid crystal layer 40. The first electrode layer 20 and the second electrode layer 30 may also be arranged on a same side of the liquid crystal layer 40.

Each sub-electrode 21 of the first electrode layer 20 may for example be connected to a data line configured to supply the sub-electrode 21 with a driving signal. A plurality of sub-electrodes 21 are driven independently, and a plurality of equivalent lenses 43 are formed by the liquid crystal layer 40.

Depending on a voltage applied to the first electrode layer 20, as shown in FIG. 1, the liquid crystal layer 40 may form a liquid crystal grating 42 directly under the first light shielding strip 51, or may form a liquid crystal prism 41 located obliquely below the first light shielding strip 51. It is also possible not to apply a voltage to some of the sub-electrodes 21 so that liquid crystals to which no voltage is applied do not change. Here, a specific form of the liquid crystal layer 40 is adjusted according to a picture to be displayed in the display process.

The sub-electrodes 21 arranged and spaced apart from each other along the first direction in the first electrode layer 20 are, for example, strip electrodes arranged side by side (the strip electrodes extend in the second direction), the sub-electrodes 21 are of the same pattern, and the plurality of sub-electrodes 21 are insulated from each other. The plurality of sub-electrodes 21 may also be arranged in array. Each sub-electrode 21 corresponds to one light extraction area 10, and one light extraction area 10 corresponds to multiple sub-electrodes 21 configured to drive the liquid crystal above the corresponding light extraction area 10.

As shown in FIG. 2, the light filter layer 50 may include a plurality of first light shielding strips 51 arranged side by side and extending in the second direction. Since each of the plurality of first light-shielding strips 51 extends in the second direction, the plurality of first light-shielding strips 51 are parallel to each other.

The light extraction area 10 and the first light shielding strip 51 are arranged in correspondence. The light extraction area 10 may be in one-to-one correspondence with the first light shielding strip 51; alternatively, each of the plurality of light extraction areas 10 may correspond to multiple first light-shielding strips 51; alternatively, multiple light extraction areas 10 may correspond to one first light shielding strip 51. For example, the light extraction area 10 and the first light-shielding strip 51 both extend in the second direction and are in one-to-one correspondence. Alternatively, one light extraction area 10 corresponds to one first light shielding strip 51, but one first light shielding strip 51 corresponds to multiple light extraction areas 10. That is, the light extraction areas 10 also have a spaced arrangement in the second direction, as shown in FIG. 2.

As shown in FIG. 1, the first light shielding strip 51 corresponding to a light extraction area 10 is arranged directly above the light extraction area 10 in the thickness direction of the liquid crystal display device. FIG. 2 illustrates a correspondence between the first light shielding strip and the light extraction area according to an embodiment of the present disclosure. Collimated light rays emitted from a portion of the light extraction area 10 that is directly facing the first light shielding strip 51 penetrate the liquid crystal layer 40 directly and are absorbed by the first light shielding strip 51.

As shown in FIG. 1, the liquid crystal display component 200 may further include a structure such as alignment layers 60 arranged on both sides of the liquid crystal layer 40. For other structures of the liquid crystal display component 200, a reference may be made to a conventional liquid crystal display component, which will not be described in detail herein.

A specific principle of adjusting a transmittance of light rays emitted from the light extraction area 10 to the light filter layer 50 is as follows: as shown in FIG. 3, when the transmittance of light rays emitted from the light extraction area 10 to the light filter layer 50 is 0 (enabling a display of grayscale 0), the light rays emitted from the light extraction area 10 are divided into three portions. A portion of the light rays under the first light shielding strip 51 directly penetrates the liquid crystal layer 40 and is absorbed by the first light-shielding strip 51 (where the sub-electrodes 21 are not applied with a voltage). The left and right light rays outside the extent of width of the first light-shielding strip 51 are refracted by the liquid crystal prisms 41 as shown in FIG. 3, then incident to a lower side of the first light shielding strip 51 to be absorbed by the first light shielding strip 51. It should be understood by a person skilled in the art that, in order to realize the display of the grayscale 0, it is necessary for the light rays emitted from the edge of the light extraction area 10 to be incident to the lower side of the first light shielding strip 51 after the light rays are refracted by the liquid crystal prisms 41. For this reason, an apex angle α of the liquid crystal prism 41 may be adjusted by adjusting the magnitude of voltage inputted to the sub-electrodes 21. Optionally, a relationship of size between the width Wa of the light extraction area 10 and the width Wb of the first light shielding strip 51 may be adjusted, to ensure that the light emitted from the edge of the light extraction area 10 may be incident to the lower side of the first light shielding strip 51 after the light is refracted by the liquid crystal prisms 41.

As shown in FIG. 4, when the transmittance of light rays emitted from the light extraction area 10 to the light filter layer 50 is non-zero (enabling a display of grayscales of 1-255), the light rays emitted from the light extraction area 10 are still divided into three portions. The liquid crystal layer directly under the first light shielding strip 51 forms the equivalent liquid crystal grating 42 under the control of electrodes. After being diffracted by the liquid crystal grating 42, the light rays exit from both sides of the first light-shielding strip 51 (areas between adjacent first light-shielding strips 51). For portions of the light rays which are not shielded by the first light-shielding strip 51, an appropriate voltage signal is applied to form liquid crystal prisms 41. Light rays incident to the liquid crystal prisms 41 are refracted and exit from areas between adjacent first light-shielding strips 51. The voltages applied to the sub-electrode 21 are different depending on grayscales, so that an amount of light exiting from the areas between the adjacent first light-shielding strips 51 is controlled. The apex angles α formed on left and right sides of the liquid crystal prisms 41 may be the same or different. Of course, at this time, the light rays refracted by the liquid crystal prisms 41 do not propagate toward the first light-shielding strip 51.

In the liquid crystal display device provided by the embodiments of the present disclosure, the width of the light extraction area 10 in the first direction is set to be larger than the width of the corresponding first light shielding strip 51 in the first direction, so that a light extraction efficiency of the light rays coupled out of the light guide plate 100 is higher and a light utilization is improved. Further, the amount of light rays exiting from the areas between adjacent first light-shielding strips 51 is increased, so that the light extraction efficiency is increased.

In addition, since the width of the light extraction area 10 in the first direction is large, a diffraction angle caused by the pinhole diffraction may be ignored, so that the width of the first light shielding strip 51 in the first direction may be reduced, and the aperture ratio of the liquid crystal display component 200 may be improved.

In some embodiments, as shown in FIG. 1 and FIG. 2, the light filter layer 50 further includes a second light shielding strip 52 arranged between adjacent first light shielding strips 51 and parallel to the first light shielding strips 51. Primary color light-filtering patterns are arranged between the first light shielding strips 51 and the second light shielding strip 52. The primary color light-filtering patterns on both sides of the first light shielding strip 51 are identical in color, and the primary color light-filtering patterns on both sides of the second light shielding strip 52 are different in color.

As shown in FIG. 1 and FIG. 2, the area between adjacent second light shielding strips 52 corresponds to a column of pixel areas emitting light of a same color (for example, pixels R emitting red light, pixels G emitting green light, or pixels B emitting blue light, as shown by dashed boxes in FIG. 2), and the first light-shielding strip 51 arranged between the adjacent second light-shielding strips 52 divides each of the pixel areas into two portions. The primary color light-filtering patterns arranged on both sides of the first light shielding strip 51 have the same color. The second light shielding strip 52 is configured to prevent light emitted from adjacent pixels from being mixed. The colors of the primary color light-filtering patterns arranged on both sides of the second light shielding strip 52 are different. The light emitted from the light extraction area 10 toward the light filter layer 50 exits from an area between the first light shielding strip 51 and the second light shielding strip 52.

The first light shielding strip 51 and the second light shielding strip 52 may be made of, for example, a material from which a black matrix is made, and are formed simultaneously.

In some embodiments, in order to facilitate the adjustment of the transmittance, the primary color light-filtering patterns on both sides of each first light shielding strip 51 are symmetrical about the first light-shielding strip 51.

That is, the first light shielding strip 51 divides the pixel area into two parts with equal area, and the two parts are distributed in mirror symmetry with the first light-shielding strip 51 being a symmetry axis.

In some embodiments, in order to prevent a total reflection of light passing through the light filter layer 50 from occurring on an upper substrate of the liquid crystal display component 200, as shown in FIG. 2, an orthographic projection of the second light shielding strip 52 on the light guide plate 100 does not overlap with the light extraction areas 10.

That is, there is no light extraction area 10 directly under the second light shielding strip 52, and the width of the light extraction area 10 in the first direction is smaller than a spacing between the adjacent second light shielding strips 52. For example, the width of the light extraction area 10 in the first direction is smaller than a width of the pixel area in the first direction. The width of the pixel area in the first direction encompasses the width of the first light shielding strip 51 in the first direction and widths of the primary color light-filtering patterns on both sides of the first light shielding strip 51 in the first direction.

For example, the plurality of pixel areas may be arranged in an array.

Figure 5:
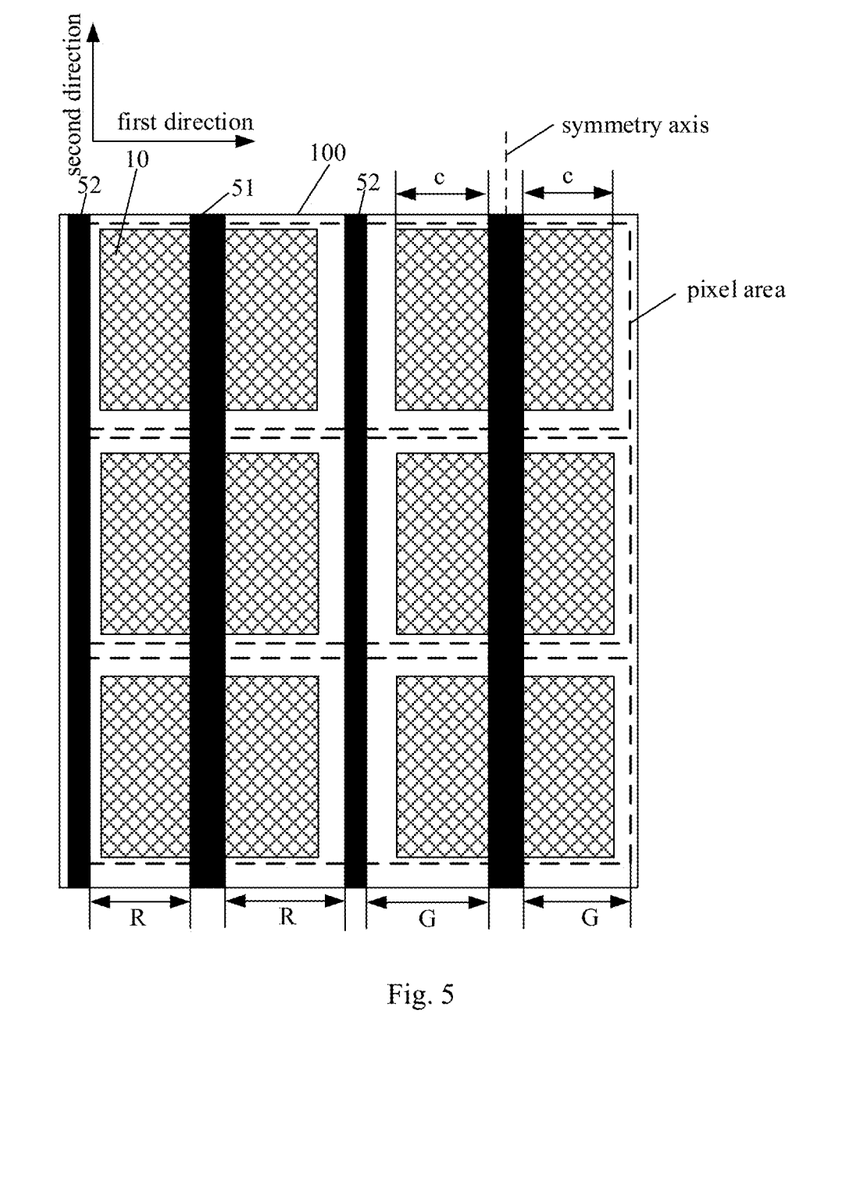
FIG. 5 illustrates a correspondence between the first light shielding strip and the light extraction area according to another embodiment of the present disclosure.

In some embodiments, in order to simplify a structure of the entire liquid crystal display device and facilitate a proper arrangement of various components, as shown in FIG. 5, each of the plurality of light extraction areas 10 and the corresponding first light shielding strip 51 are axisymmetric; a symmetry axis of each of the plurality of light extraction areas 10 coincides with a symmetry axis of the orthographic projection of the corresponding first light shielding strip 51 on the light guide plate 100; the symmetry axis of each of the plurality of light extraction areas 10 is parallel to the second direction.

That is, in the first direction, distances c from edges of the light extraction area 10 on both sides of the symmetry axis to respective nearest edges of the first light shielding strip 51 are equal.

In some embodiments, the difference c between a half width of the light extraction area 10 in the first direction and a half width of the first light shielding strip 51 in the first direction is determined by a thickness d of the liquid crystal layer 40, an angle θ between light rays emitted from the light extraction area 10 to the light filter layer 50 and the thickness direction of the liquid crystal display device, and a distance h from a light exiting surface of the light guide plate 100 to the light filter layer 50.

Figure 6:
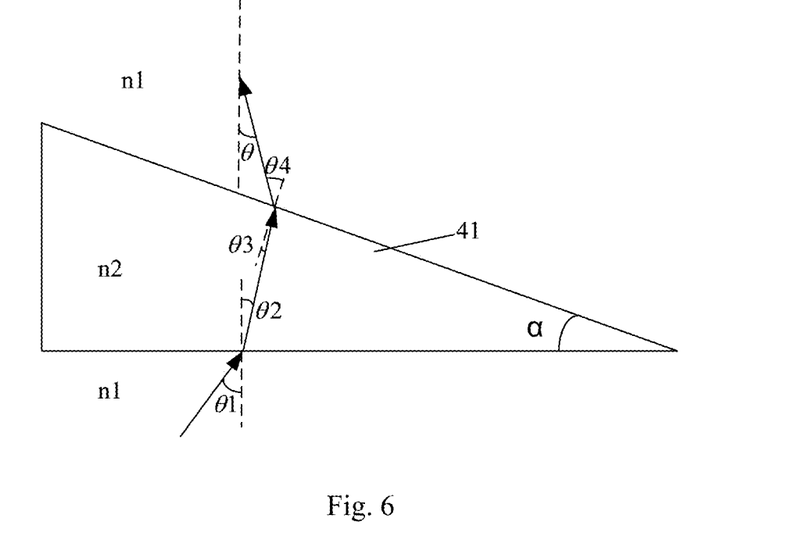
FIG. 6 illustrates a refraction path of a light ray emitted from the light extraction area in an equivalent lens according to an embodiment of the present disclosure.

As shown in FIG. 6, the angle θ between the light rays emitted from the light extraction area 10 toward the light filter layer 50 and the thickness direction of the liquid crystal display device refers to an angle between the light rays which are emitted from the light extraction area 10 toward the liquid crystal prism 41 and then refracted by the liquid crystal prism 41 toward the light filter layer 50 and the thickness direction of the liquid crystal display device. n2 is a refraction index of the liquid crystal layer 40, and n1 is a refraction index of a medium on both sides of the liquid crystal layer 40. θ1 is an angle (incident angle) of light rays emitted from the light extraction area 10 toward the liquid crystal prism 41. θ2 is an angle (refraction angle) by which the light rays are refracted in the liquid crystal prism 41. θ3 is an incident angle of the light rays upon exiting from the liquid crystal prism 41. θ4 is a refraction angle by which the light rays are refracted when exiting from the liquid crystal prism 41.

The angle θ may be calculated according to a geometrical relationship and the refraction law. Since sin θ1*n1=sin θ2*n2, 90°−θ2+90°−θ3+α=180°, θ2=−θ3+α, and sin θ3*n2=sin θ4*n1, it can be derived that θ=θ4−θ3+θ1−θ2. The refraction index of the liquid crystal prism 41 is $n2=n_e n_o/\sqrt{n_e^2\cos^2\alpha+n_o^2\sin^2\alpha}$, $n_o$ is an extraordinary refraction index and $n_o$ is an ordinary refraction index.

Figure 7:
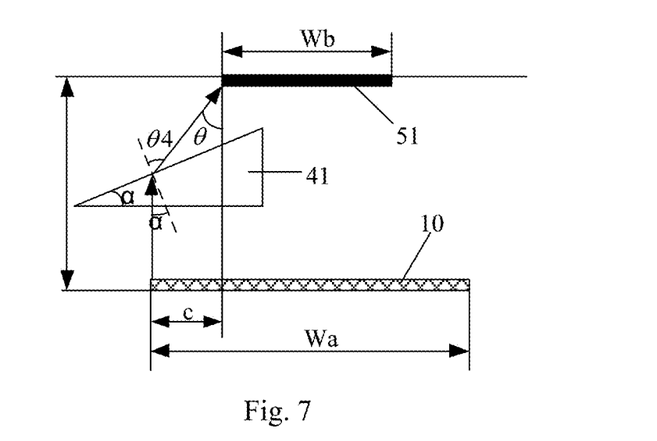
FIG. 7 is a schematic diagram illustrating relative sizes of the first light shielding strip and the light extraction area according to an embodiment of the present disclosure.

In some embodiments, as shown in FIG. 7, the light emitted from the light extraction area 10 is perpendicular to a light entry surface of the liquid crystal prism 41, i.e., θ1=θ2=0. In this case, the refraction path of light in the liquid crystal display device is as shown in FIG. 7.

At this time, θ=θ4−α, where α is the apex angle of the liquid crystal prism, θ4 is an exit angle of the collimated light refracted by the liquid crystal prism, and θ is the angle between refracted rays and a vertical normal.

In this way, the distance c from the edge of the light extraction area 10 to the edge of the first light shielding strip 51 should satisfy the following conditions: a maximum value of c is $c_{max}$=h*tan θ; and a minimum value of c is $c_{min}$=(h−d)*tan θ.

In the first direction, the width Wa of the light extraction area 10 is equal to the width Wb of the light shielding strip plus the distances c from the edges of the light extraction area 10 to respective edges of the light shielding strip. When the light extraction area 10 is axisymmetric, the width of the light extraction area 10 is Wa=Wb+2c.

Figure 8:
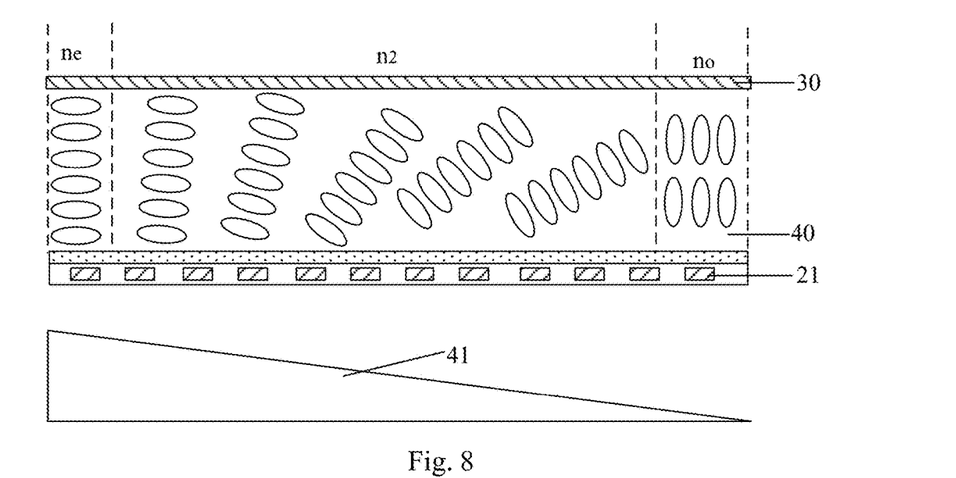
FIG. 8 is a schematic diagram of an equivalent lens according to an embodiment of the present disclosure.
Figure 9:
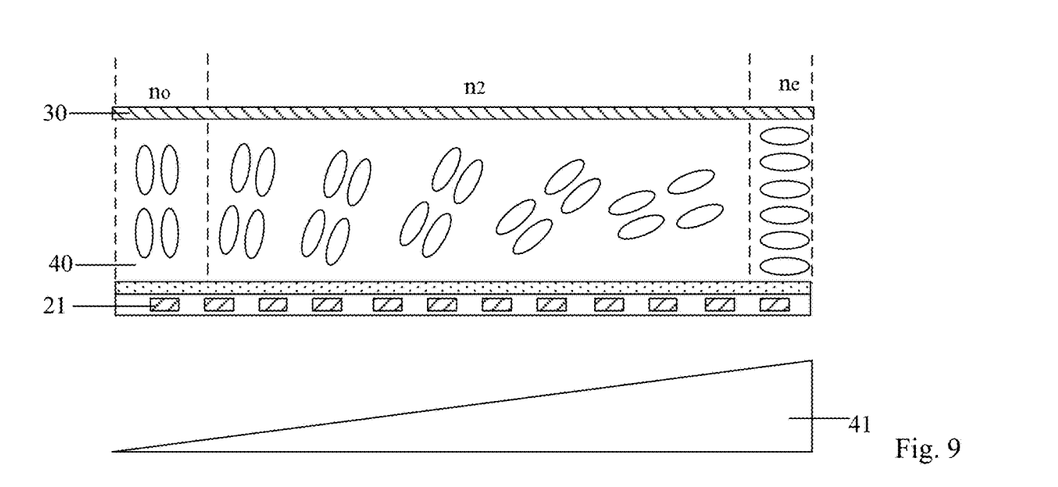
FIG. 9 is a schematic diagram of an equivalent lens according to an embodiment of the present disclosure.

FIG. 8 is a schematic diagram of an equivalent lens according to an embodiment of the present disclosure, FIG. 9 is a schematic diagram of another equivalent lens according to an embodiment of the present disclosure. For example, in the embodiment as shown in FIG. 8, an initial orientation of a long axis of liquid crystal molecules is horizontal, and the liquid crystal molecules act on polarized light (i.e., e-light) that vibrates in plane. In the embodiment as shown in FIG. 9, an initial orientation of a long axis of liquid crystal molecules is vertical, and the liquid crystal molecules act on polarized light (i.e., o-light) that vibrates in plane.

By controlling a rotation angle of liquid crystals, different effective refraction indexes may be achieved, and the magnitude of refraction index is associated with the rotation angle of the liquid crystal. In order to prevent a total reflection of light passing through the light filter layer 50 from occurring on the upper substrate of the liquid crystal display component 200, an apex angle α<40° of the formed liquid crystal prism should be allowed for in designing the width of the light extraction area 10.

Figure 10:
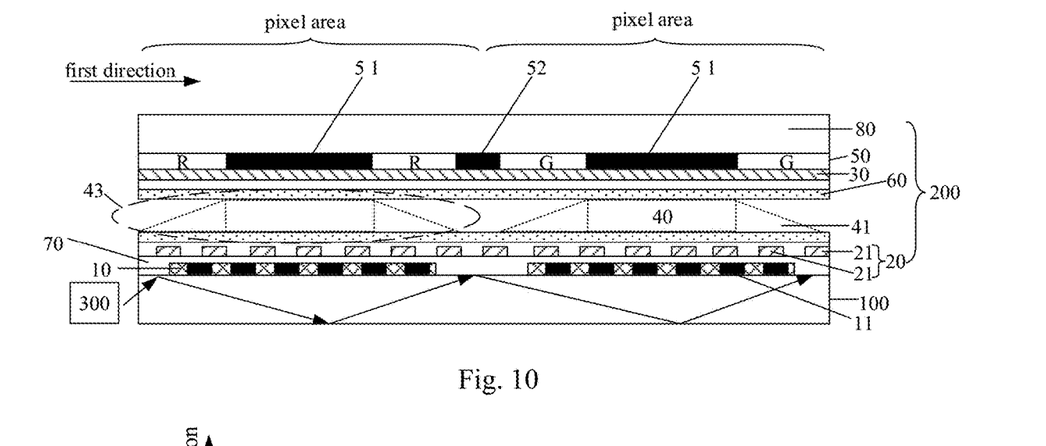
FIG. 10 is a schematic structural diagram of a liquid crystal display device according to an embodiment of the present disclosure.

In some embodiments, in order to ensure that light propagates in the light guide plate 100, as shown in FIG. 10, the liquid crystal display device further includes a filling layer 70 arranged on the light exiting surface of the light guide plate 100; the light extraction area 10 is provided with a light extraction grating 11; and a refraction index of the filling layer 70 is smaller than a refraction index of the light guide plate 100, and is different from a refraction index of a grating strip of the light extraction grating 11.

The liquid crystal display component 200 may further include an upper substrate 80 arranged on a side of the light filter layer 50 that is away from the liquid crystal layer 40.

In some embodiments, as shown in FIG. 5, the plurality of light extraction areas 10 and the plurality of pixel areas are in one-to-one correspondence; each of the plurality of light extraction areas 10 is located in an orthographic projection of the corresponding pixel area on the light guide plate 100.

That the light extraction areas 10 being arranged in array refers to that the light extraction areas 10 are evenly spaced in the first direction and the second direction. From a top view, an outline of each of the plurality of pixel areas (shown by dashed boxes in FIG. 5) encloses an outline of the corresponding light extraction area 10.

Figure 11:
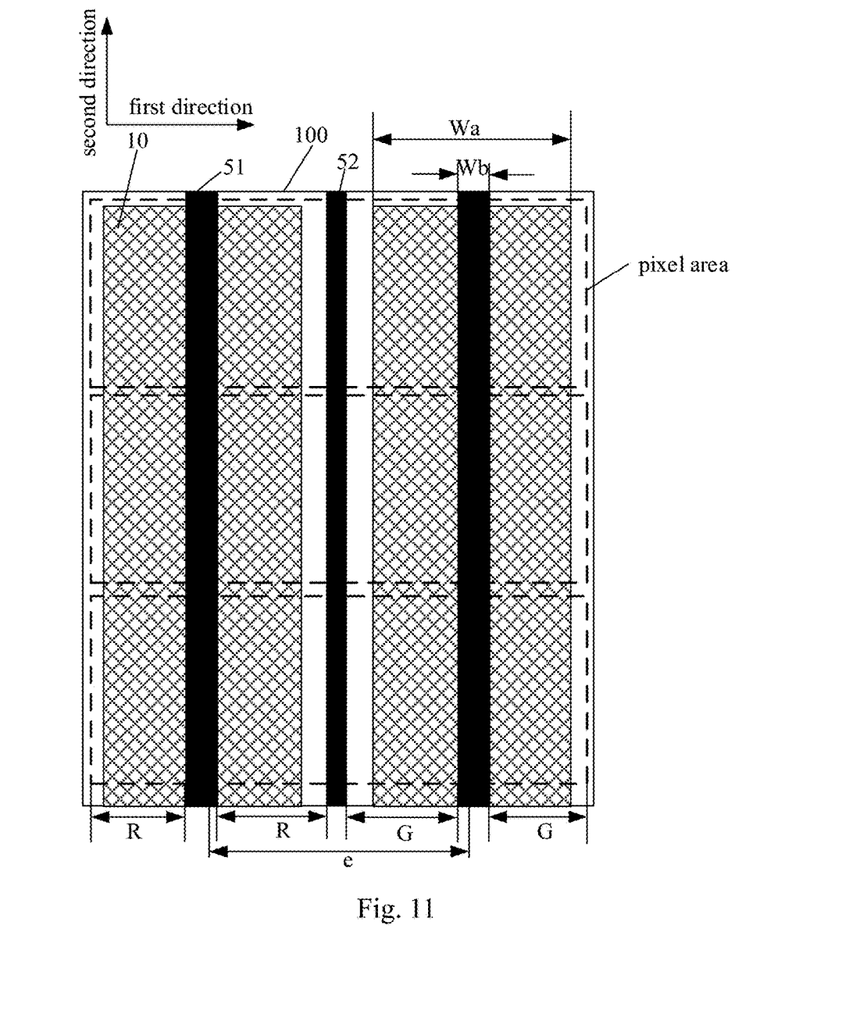
FIG. 11 illustrates a correspondence between the first light shielding strip and the light extraction area according to another embodiment of the present disclosure.

In some embodiments, as shown in FIG. 11, each of the plurality of light extraction areas 10 corresponds to a column of pixel areas arranged along the second direction. Thus, a manufacturing process and the structure of the light guide plate 100 may be further simplified.

The embodiments of the present disclosure provide a display method applied to the liquid crystal display device described above. The display method includes: inputting a data signal to the first electrode layer 20 and the second electrode layer 30 according to an image to be displayed, thereby forming an equivalent lens in each pixel area; and adjusting a direction of a light beam emitted from each light extraction area 10 by using the equivalent lens, thereby adjusting an amount of light incident to the corresponding first light shielding strip 51.

In case that pixel data of the image to be displayed includes at least one grayscale 0 pixel data, the data signal input to the first electrode layer 20 includes a data signal configured to change the form of the equivalent lens 43 corresponding to the pixel data, such that a transmittance of the pixel used to output the pixel data is zero in the liquid crystal display device.

Therefore, according to the present disclosure, to achieve a display of grayscales of 0-255, it is necessary to apply a data signal to the first electrode layer 20 or the second electrode layer 30 for each grayscale. Of course, the applied voltage is adjusted according to the grayscale to be displayed, to provide a desired form of lens.

In the display method provided by the embodiments of the present disclosure, the data signal is applied to the first electrode layer 20 according to the gray scale to be displayed; the width of the light extraction area 10 in the first direction may be set to be larger than the width of the corresponding first light shielding strip 51 in the first direction, so that a light extraction efficiency of the light coupled out of the light guide plate 100 is high and a light utilization is improved. Further, the amount of light exiting from the area between adjacent first light-shielding strips 51 is increased, so that the light extraction efficiency is increased.

In addition, since the width of the light extraction area 10 in the first direction is large, a diffraction angle caused by the pinhole diffraction may be ignored, so that the width of the first light shielding strip 51 in the first direction may be reduced, and the aperture ratio of the liquid crystal display component 200 may be improved.

The aforementioned are merely specific implementations of the present disclosure, but the scope of the disclosure is by no means limited thereto. Any modification or substitution that would easily occurred to those skilled in the art, without departing from the technical scope disclosed in the disclosure, should be encompassed in the scope of the present disclosure. Therefore, the scope of the present disclosure is to be defined by the scope of the claims.

What is claimed is:

1. A liquid crystal display device, comprising:
a light guide plate comprising a plurality of light extraction areas arranged along a first direction, and
a liquid crystal display component arranged in a light exiting direction of the light guide plate,
wherein, the liquid crystal display component comprises a plurality of pixel areas arranged in array; in a thickness direction of the liquid crystal display component, each of the plurality of pixel areas comprises a first electrode layer, a second electrode layer, a liquid crystal layer, and a light filter layer arranged on a side of the liquid crystal layer that is away from the light guide plate; the light filter layer comprises a plurality of first light shielding strips arranged along the first direction; each of the plurality of first light shielding strips extends along a second direction substantially perpendicular to the first direction,
wherein each of the plurality of light extraction areas corresponds to one first light shielding strip; a width of each of the plurality of light extraction areas in the first direction is larger than a width of the corresponding first light shielding strip in the first direction, and
wherein the plurality of light extraction areas and the plurality of pixel areas are in one-to-one correspondence; each of the plurality of light extraction areas is located in an orthographic projection of the corresponding pixel area on the light guide plate.

2. The liquid crystal display device according to claim 1, wherein the light filter layer further comprises a second light shielding strip arranged between adjacent first light shielding strips of the plurality of first light shielding strips and parallel to the first light shielding strips;
a primary color light-filtering pattern is arranged between each of the adjacent first light shielding strips and the second light shielding strip; the primary color light-filtering patterns on both sides of each of the plurality of first light shielding strips are identical in color, and the primary color light-filtering patterns on both sides of the second light shielding strip are different in color.

3. The liquid crystal display device according to claim 2, wherein the primary color light-filtering patterns on both sides of each of the plurality of first light shielding strips are symmetrical about the first light-shielding strip.

4. The liquid crystal display device according to claim 2, wherein an orthographic projection of the second light shielding strip on the light guide plate does not overlap with the light extraction areas.

5. The liquid crystal display device according to claim 1, wherein both each of the plurality of light extraction areas and the corresponding first light shielding strip are axisymmetric; a symmetry axis of each of the plurality of light extraction areas coincides with a symmetry axis of an orthographic projection of the corresponding first light shielding strip on the light guide plate; the symmetry axis of each of the plurality of light extraction areas is parallel to the second direction.

6. The liquid crystal display device according to claim 5, wherein a difference c between a half width of each of the plurality of light extraction areas in the first direction and a half width of each of the plurality of first light shielding strips in the first direction is determined by a thickness d of the liquid crystal layer, an angle θ between a light ray emitted from the light extraction area to the light filter layer and a thickness direction of the liquid crystal display device, and a distance h from a light exiting surface of the light guide plate to the light filter layer.

7. The liquid crystal display device according to claim 6, wherein a maximum value of the difference between the half width of each of the plurality of light extraction areas in the first direction and the half width of each of the plurality of first light shielding strips in the first direction is $c_{max}$=h*tan θ; and a minimum value of the difference between the half width of each of the plurality of light extraction areas in the first direction and the half width of each of the plurality of first light shielding strips in the first direction is $c_{min}$=(h−d)*tan θ.

8. The liquid crystal display device according to claim 1, further comprising: a filling layer arranged on a light exiting surface of the light guide plate;

wherein, each of the plurality of light extraction areas is provided with a light extraction grating; and a refraction index of the filling layer is smaller than a refraction index of the light guide plate, and is different from a refraction index of a grating strip of the light extraction grating.

9. The liquid crystal display device according to claim 1, wherein each of the plurality of light extraction areas corresponds to a column of the pixel areas arranged along the second direction.

10. A display method, applied to the liquid crystal display device according to claim 1, comprising:

inputting a data signal to the first electrode layer and the second electrode layer according to an image to be displayed, such that an equivalent lens is formed in each of the plurality of pixel areas; and adjusting a direction of a light beam emitted from each of the plurality of light extraction areas by using the equivalent lens, so as to adjust an amount of light incident to the corresponding first light shielding strip.

11. The liquid crystal display device according to claim 2, wherein each of the plurality of light extraction areas corresponds to a column of the pixel areas arranged along the second direction.

12. The liquid crystal display device according to claim 3, wherein each of the plurality of light extraction areas corresponds to a column of the pixel areas arranged along the second direction.

13. The liquid crystal display device according to claim 5, wherein each of the plurality of light extraction areas corresponds to a column of the pixel areas arranged along the second direction.

14. The liquid crystal display device according to claim 8, wherein each of the plurality of light extraction areas corresponds to a column of the pixel areas arranged along the second direction.

* * * * *